US006529724B1

(12) United States Patent
Khazaka et al.

(10) Patent No.: US 6,529,724 B1
(45) Date of Patent: Mar. 4, 2003

(54) SYSTEM AND METHOD FOR MANAGING CONTACT INFORMATION BASED ON USE OF A COMMUNICATIONS DEVICE

(75) Inventors: Samir K. Khazaka, San Diego, CA (US); Diego A. Kaplan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/420,546

(22) Filed: Oct. 26, 1999

(51) Int. Cl.[7] .............................................. H04M 11/00
(52) U.S. Cl. ...................... 455/405; 455/412; 455/418; 455/419; 455/556; 455/557; 379/142.06; 379/142.07; 379/85
(58) Field of Search ................................ 455/405, 412, 455/575, 413, 414, 418, 419, 556, 557; 379/167.1, 142.06, 142.07, 83, 85

(56) References Cited

U.S. PATENT DOCUMENTS

| | | | | |
|---|---|---|---|---|
| 5,493,692 A | * | 2/1996 | Theimer et al. | ............ 455/26.1 |
| 5,568,546 A | * | 10/1996 | Marutiak | .................... 379/355 |
| 5,903,634 A | | 5/1999 | Wakabayashi et al. | ...... 379/127 |
| 6,005,927 A | * | 12/1999 | Rahrer et al. | ................ 379/142 |
| 6,173,316 B1 | * | 1/2001 | De Boor et al. | ............ 709/218 |
| 6,195,564 B1 | * | 2/2001 | Rydbeck et al. | ............. 455/557 |
| 6,215,799 B1 | * | 4/2001 | Mitchell et al. | ............ 370/524 |
| 6,230,214 B1 | * | 5/2001 | Liukkonen et al. | ............ 701/1 |
| 6,247,050 B1 | * | 6/2001 | Tso et al. | .................... 709/224 |

FOREIGN PATENT DOCUMENTS

| | | |
|---|---|---|
| EP | 0 709 996 A2 | 5/1996 |
| WO | WO 98/27706 | 6/1998 |

* cited by examiner

*Primary Examiner*—Edward F. Urban
*Assistant Examiner*—Marleau Milord

(57) ABSTRACT

The contact information manager manages contact information based on information automatically obtained through use of a communications device. The contact information manager stores information about contacts and allows options for retrieval of the contact information. Contact information is managed by modifying values in one or more dynamic fields with call information obtained through use of the communications device. The contact information is retrieved by a user selecting to retrieve information and providing a retrieval selection indicating a preference of format of the presentation of the retrieved contact information.

20 Claims, 6 Drawing Sheets

VOICE CONTACT INFORMATION ⟵ 212A

214A ⟶
DATABASE TAG IDENTIFIER: #1
TAG IDs OF OTHER DATABASES TO SEARCH: [    ]
216A ⟶

| 218A NAME | 220A DESTINATION NUMBER | DYNAMIC FIELDS (222A) | | STATIC FIELDS (224A) | |
|---|---|---|---|---|---|
| | | FREQUENCY OF OUTGOING CALLS COUNTER | ADDITIONAL DYNAMIC FIELDS | PRICE PER MINUTE | ADDITIONAL STATIC FIELDS |
| JOE | 1-800-111-1111 | 20 | | $0.0 | |
| TED | 1-201-111-1111 | 15 | | $.50 | |
| JIM | 1-410-111-1111 | 10 | | $.25 | |

DATA CONTACT INFORMATION ⟵ 212B

214B ⟶
DATABASE TAG IDENTIFIER:
TAG IDs OF OTHER DATABASES TO SEARCH: [    ]
216B ⟶

| 218B NAME | 220B DESTINATION NUMBER | DYNAMIC FIELDS (222B) | | STATIC FIELDS (224B) | |
|---|---|---|---|---|---|
| | | FREQUENCY OF OUTGOING CALLS COUNTER | ADDITIONAL DYNAMIC FIELDS | DATA RATE | ADDITIONAL STATIC FIELDS |
| ABC Co. | 1-800-222-2222 | 10 | | 1,56Kbps | |
| XYZ Co. | 1-800-333-3333 | 5 | | 96Kbps | |

FIG. 2B

SYSTEM AND METHOD FOR MANAGING CONTACT INFORMATION BASED ON USE OF A COMMUNICATIONS DEVICE

BACKGROUND OF THE INVENTION

1. Field of the Invention

The present invention relates generally to communications systems, and more particularly, to a method and system for managing contact information in a communications system.

2. Related Art

Electronic phone books are used to store phone numbers electronically in telephones or other communications devices. Typically electronic phone books store information that would be included in a paper telephone book issued by a local telephone company, such as a name or entity to be called and the telephone number of the person or entity. Storing phone book information electronically within a telephone simplifies use of the telephone because the user can retrieve phone numbers needed to place calls directly from the telephone. Carrying the information needed to place calls within the telephone avoids having to find a paper telephone book or carry telephone numbers separately such as in a personal address and telephone book, personal organizational planner, or personal notes. The phone book information is readily available to the user in the same device that is used to place the call.

Traditional electronic phone books require a user to enter the phone book information directly into the communications device. Users make a selection with the keypad of the telephone indicating a desire to store information in the electronic phonebook and enter the information to be stored into the telephone. For example, if a user wants to enter a family member's telephone number, the user makes a selection on the keypad of their telephone to request an update of their electronic phone book and then responds to menu prompts to input information, such as the family's member's name and the family member's telephone number. The user then issues a request to store the information in the electronic phone book of the telephone. The user retrieves the information at a later time by selecting the keypad command to retrieve information from the electronic phone book.

Electronic phone books typically can be sorted in one of two ways. First, the information in the electronic phone book can be sorted by the order in which the user entered the information. For example, if a user enters three phone numbers into an electronic phone book, one phone number each for Joe, Ted and Jim, the phone book is sorted based on the order in which the user entered the phone numbers. If the user entered the phone numbers in the order of Joe, Ted and Jim, then when the user selected to retrieve the entries, the entries would be ordered as Joe, Ted, and Jim. So, if the user wanted to retrieve Jim's phone number, the user would have to first view Joe's phone number and then Ted's phone number before the user could view Jim's phone number.

Alternatively, the phone book may be sorted alphabetically based on the name entered by the user. With the alphabetical sort, if a user entered one phone number each for Joe, Ted and Jim, the phone book is sorted alphabetically based on the name. In other words, when the information is retrieved from the electronic phone book, the user views Jim's name and phone number first, then Joe's, then Ted's.

A disadvantage is that where there are a large number of entries, retrieval may be difficult with the current sorting methods. For example, a user retrieving a frequently called phone number from an electronic phone book storing a hundred phone numbers, would have to review perhaps 80 entries to get to a frequently called entry that was the $81^{st}$ entry in their electronic phone book. Because users have to browse through many phone numbers to retrieve a frequently called number, users will tend to limit the number of phone numbers they store to a small number.

What is needed is a system and method for making stored phone numbers more easily accessible to a user.

SUMMARY OF THE INVENTION

The present invention provides a system and method for managing contact information electronically in a communications device, also referred to as a communications network interface device. With the present invention, contact information is managed based on information automatically obtained through use of the communications network interface device. The present invention stores traditional contact information such as name and destination number, also referred to as a telephone number. Also, the present invention stores in dynamic fields additional information obtained automatically through use of the communications network interface device.

The system of the present invention includes, in a communications network interface device, an apparatus for managing contact information including a memory containing a static field and a dynamic field. In addition, the apparatus includes (1) capability for storing contact information in the memory and associating the stored contact information with the static field, (2) capability for storing information relating to a specific active communication of the interface device within the communications network and for associating the information relating to the specific active communication with the dynamic field of memory, and (3) capability for sorting the stored contact information according to the stored information associated with the dynamic field.

The method of the present invention stores contact information in memory and associates the stored contact information with a static field. The method stores information relating to a specific active communication of the interface device within the communications network. It associates the stored information with a dynamic field of the memory, and sorts the stored contact information according to the stored information associated with the dynamic field.

One advantage of the system and method of the present invention is that additional options are possible for retrieval of contact information. For example, the communication network interface device can automatically record the number of times a specific telephone number is dialed by the communication device. The contact information can then be sorted based on the frequency of calling. This eases retrieval of frequently called numbers within a large number of entries in an electronic phone book.

BRIEF DESCRIPTION OF THE FIGURES

The features, objects and advantages of the present invention will become more apparent from the detailed description set forth below when taken in conjunction with the drawings, in which like reference characters identify corresponding elements throughout and wherein:

FIG. 2B is a block diagram of an exemplary contact information manager implementation;

DETAILED DESCRIPTION OF THE PREFERRED EMBODIMENTS

With the system and method of the present invention, contact information is managed automatically by a contact information manager within a communications network interface device. The contact information manager can manage information based on information automatically obtained through use of the communications network interface device. One embodiment of the communications device of the present invention is a mobile telephone that operates in a mobile telephone system such as a cellular or satellite system. The invention can be used in any telephone, whether wired or wireless, that stores and displays contact information.

Figure 1:
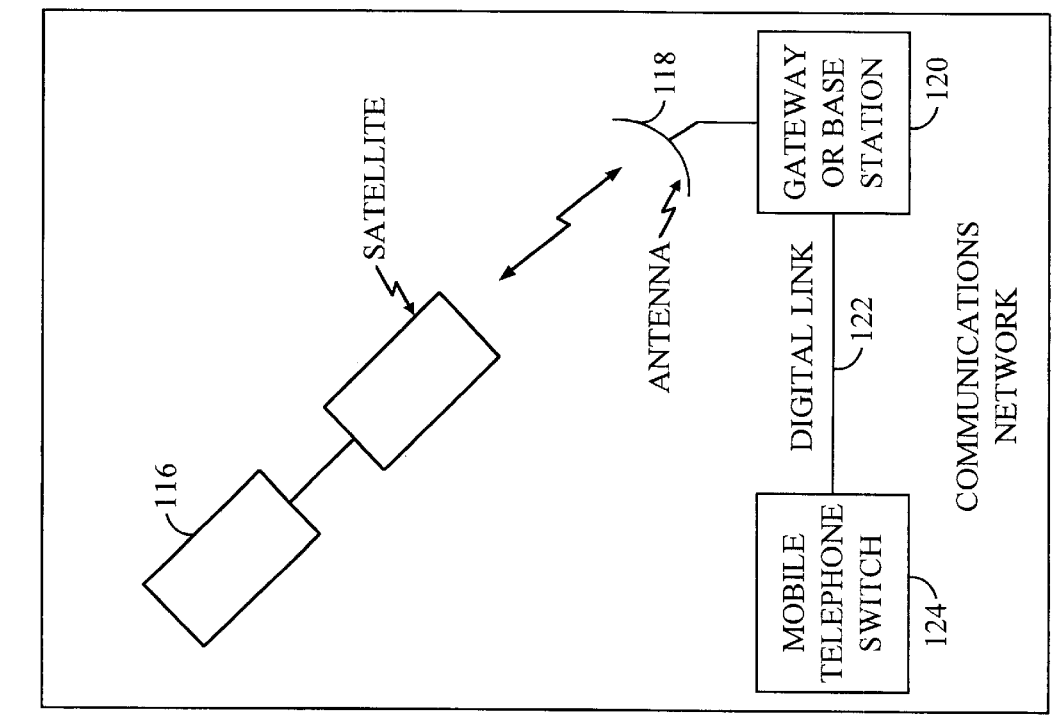
FIG. 1 is a block diagram of a communications network interface device.
Figure 1:
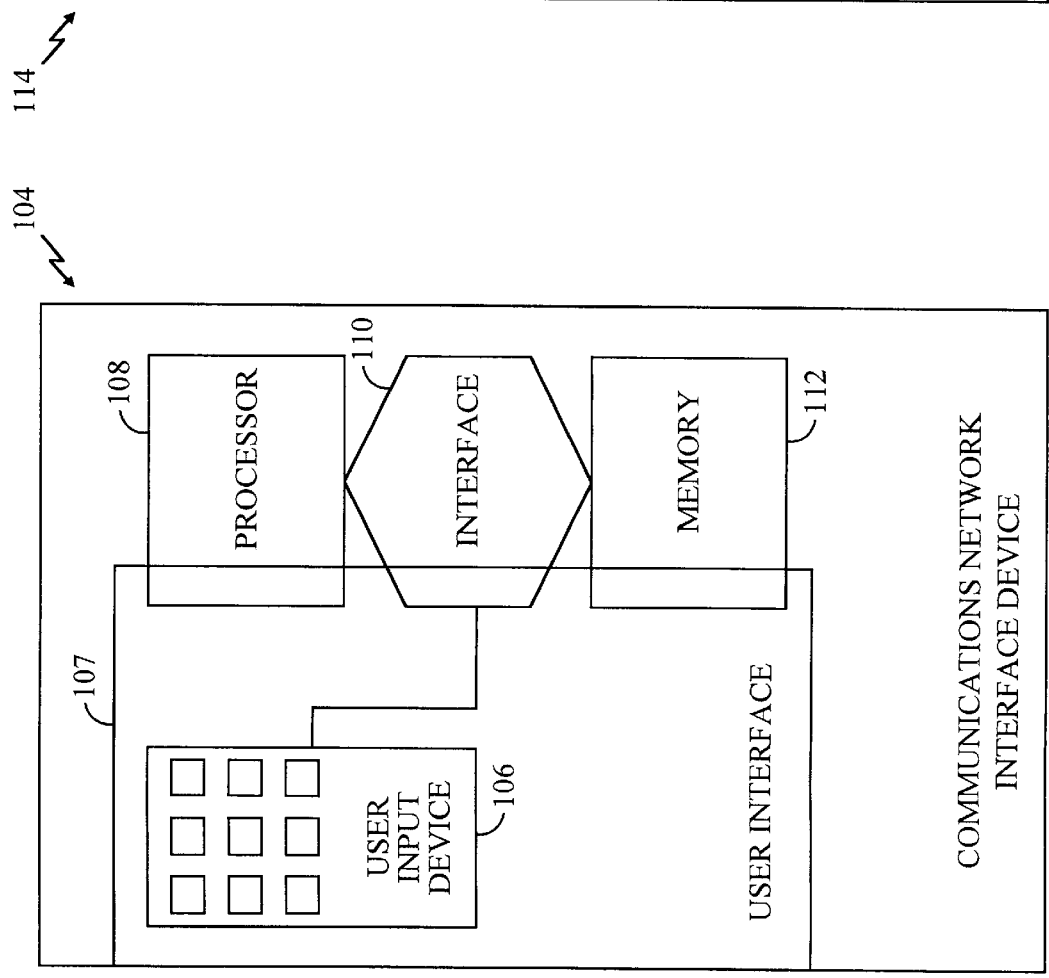

FIG. 1 is a block diagram of a communications network interface device 104. Examples of a communications network interface device 104 include a portable, mobile or satellite phone, wired phone, or other device that can interface with a communications network. A communications network interface device includes a user input device 106, a processor 108, an interface 110, and a memory 112. User input device 106 is within a user interface 107 and may be a keypad on a telephone, a keyboard on a personal computer or any other device that can accept user input. The user interface 107 also comprises some processing and memory capability of processor 108 and memory 112 in order to process and store data entered by the user in user input device 106.

Processor 108 may comprise one or more processors that have the capability of processing computer software in the form of lines of executable code comprising commands from a computer programming language residing in memory 112. Processor 108 may comprise processing capability dispersed among one or more application specific integrated circuits (ASICs) or other hardware capable of processing computer software. One ASIC preferred for wireless communication network interface device 104 use is an MSM chip which incorporates the processor 108 and other CDMA functionality. Exemplary processors 108 in the ASICs are the Arm processor and the Intel 186 processor currently used in mobile cellular phones or a personal computer processor.

Connection of the elements of communications network interface device 104 will next be illustrated. User input device 106 is connected to interface 110 for connectivity with processor 108 and memory 112. Interface 110 is any connectivity that allows electrical components within a communications network interface device 104 to be connected and transmit electrical signals.

Memory 112, also referred to as storage medium, is any storage medium which includes long term memory, non-volatile memory, removable memory such as a floppy disk, or any other memory that can be used to store computer code or information processed by computer software. Memory 112 may be dispersed among one or more hardware storage medium components. Information stored in memory 112 remains stored when the communications network interface device 104 is powered down.

User interface 107 includes components and software for accepting user input. User interface 107 includes user input device 106. Also, user interface 107 includes software residing in memory 112 and processed by processor 108 that interprets user input and temporarily stores call information for the duration of the call. Software for accepting user input will be described in further detail with respect to FIGS. 2A and 2B.

In an exemplary embodiment, communications network interface device 104 is a satellite telephone. In alternate embodiments, communications network interface device 104 may be a cellular telephone, operating in a terrestrial cellular environment, or it may be a wireline telephone that is physically connected to an exchange within the communications network.

Wireless telephones are communications devices that function in a wireless environment. There are three basic types of wireless telephones. Portable phones are typically small, handheld devices and can be carried on the person. Mobile phones are typically mounted in a vehicle; they have a base unit or cradle that is fixedly mounted to the vehicle, usually inside the passenger compartment, and a handset that is connected to the base unit or cradle by a wire. A fixed wireless phone is usually mounted in a single location. Any of these types of phones can be operated over a terrestrial cellular network or over a satellite communications network. Some wireless phones are capable of operating over both cellular and satellite systems.

Standard wireline phones are those that are physically connected to the communications network by wires Telephones that operate over short range wireless links, such as portable phones that are used in the home or small business environment, and which transmit to and receive signals from a single fixed base station over a short range (for example, several hundred to a thousand meters) are generally considered to fall in the category of wireline phones.

Other devices that may be used to place a call include a paging receiver, a wireless personal computer, and any other device that can transmit via a wireless communications network.

The system and method of this invention is applicable to any communications network interface device that contains a memory for storing destination phone numbers, advantageously, but not necessarily, in alphanumeric format so that names associated with the destination numbers can be stored. For either wired or wireless devices, a phone card or computer program product may be used which would include memory comprising the present invention.

The functionality of communications network interface device 104 can be described with respect to an exemplary call by referencing the components illustrated in FIG. 1 that would be used to carry the particular call. A user places a call using communications network interface device 104.

Communications network interface device 104 is used by a caller to transmit signals to and receive signals from a communications network 114 in order to complete a call to a recipient. An exemplary communication network is a mobile telephone system using code division multiple access (CDMA) such as the network described in U.S. Pat. No. 5,103,459 entitled "System and Method for Generating Signal Waveforms in the CDMA Cellular Telephone System" issued Apr. 17, 1992 to the assignee of the present invention and incorporated herein by reference.

In the example of the satellite phone, communications network interface device 104 transmits to and receives signals from a gateway 120 within communications network 114 via an antenna 118 and a satellite 116 that is within range and has the capacity to handle the communication. In a terrestrial cellular communications network, gateway 120 would be replaced by a base station and satellite 116 would not be used. Communications network interface device 104 would then transmit to and receive signals directly from antenna 118.

Figure 2A:
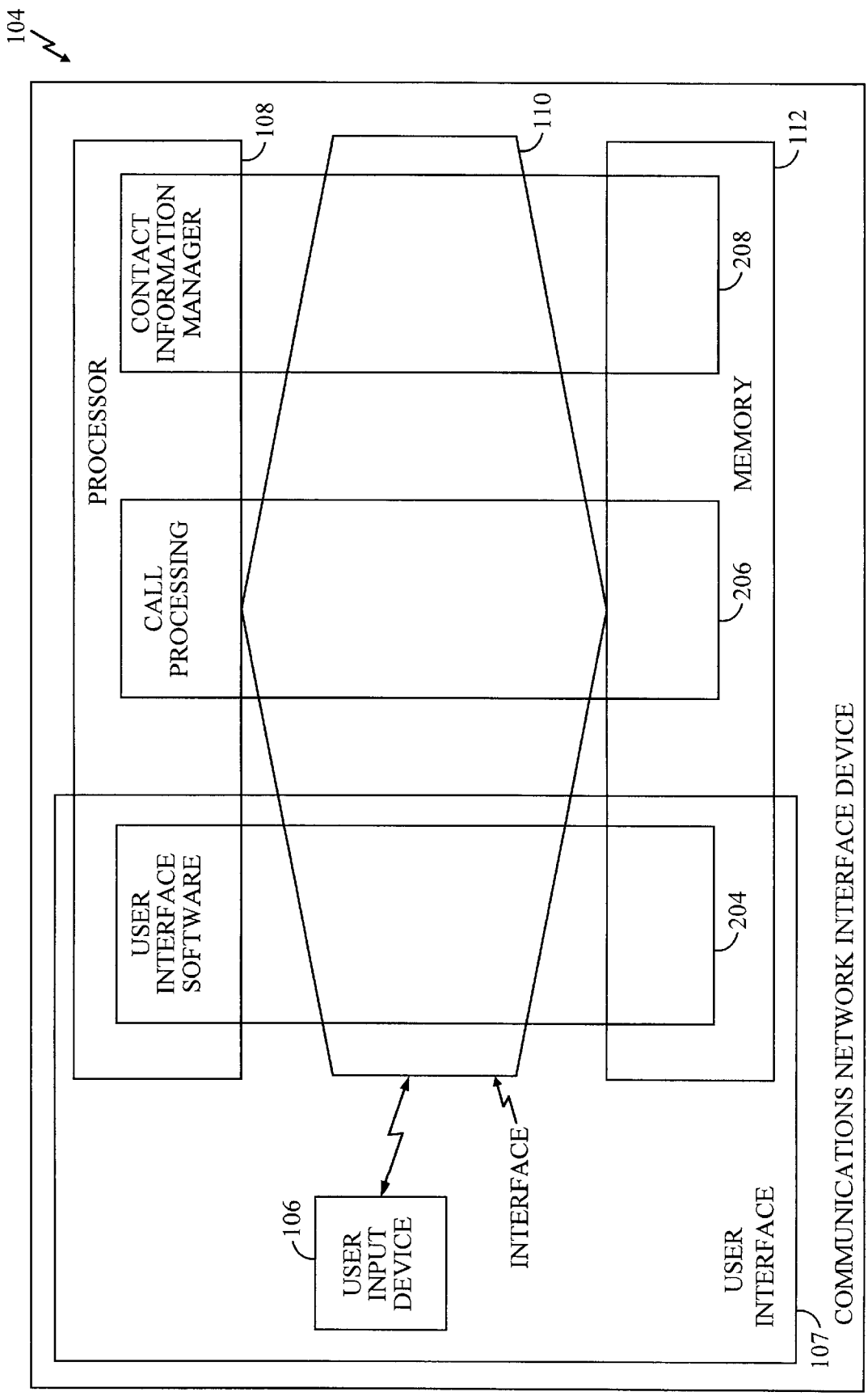
FIG. 2A is a block diagram of software of a communications network interface device.

FIG. 2A is a block diagram of communications network interface device 104. Memory 112, within communications network interface device 104, stores lines of code which are processed by processor to perform certain programmed functions. The software components include user interface software 204, a call processing component 206, and a contact information manager 208.

User interface software 204 comprises one or more software modules that stores the information for a particular call for the duration of the call. If user interface software 204 is implemented with multiple software modules, the software modules may be within one subroutine and/or computer program or dispersed through multiple subroutines and/or programs. Examples of fields that would be stored by the user interface software are the destination number, the time of the call, the length of the call, and any other information that may be obtained by use of communications network interface device 104 with respect to a particular call. User interface software 204 receives information, such as the destination number, from user input device 106. In addition, user interface software 204 has the capability to calculate values based on information received, such as the duration of the call. User interface software 204 also temporarily stores information in temporary memory such as in Random Access Memory (RAM).

Call processing component 206 performs processing of the telephone call in order to complete or terminate the call via communications network 114 to a called party. Call processing component 206 receives a destination number dialed by the calling party using communications network input device 104. Call processing component 206 performs the processing necessary to route the call through communications network 114 to the called party. For example, in a cellular communications network, call processing component 206 would transmit the information needed to send the call to an antenna, then via a digital link to a base station and mobile telephone switch in order to connect to the called party. In a satellite communications system, the call information would be transmitted via satellite 118 to antenna 116 and then to gateway 120. The destination number entered by the calling party using communications network input device 104 is the number corresponding to another communications network interface device. Call processing component 206 performs processing that needs to be completed by communications network interface device 104 to transmit the call via communications network 114 and complete the call to the called party's communication network interface device. Similar to user interface software 204, call processing component 206 may comprise one or more software modules within one subroutine and/or program or dispersed through multiple subroutines and/or programs.

Contact information manager 208 maintains static fields that do not change based on the use of communications network interface device 104. Static fields include one or more contact identifiers, such as the destination number of a contact and possibly a contact name, such as the name of the person or entity associated with the destination number. Additional static fields may include a field indicating whether a particular destination number transmits voice or data, a price per minute field containing the price per minute to send a call to a particular destination number, a quality of the link field stored for destination numbers corresponding to a data link, and any other field that does not change based on use of communications network interface device 104.

Contact information manger 208 also maintains dynamic fields that change based on the use of communications network interface device 104 and may be tracked by contact information manager 208. Exemplary dynamic fields include the frequency of outgoing calls sent to each of the destination numbers, the frequency of incoming calls received from the destination numbers, and any other field containing information that would be dynamically modified based on use of communications network interface device 104. Examples of such dynamic fields are set out below in Table 1.

| Dynamic Fields | Description |
| --- | --- |
| Frequency of outgoing calls field | Number of outgoing calls dialed to a destination number. Maintained in contact information manager 208 by incrementing a counter associated with a particular designation number by one each time the destination number is entered into user input device 106. |
| Frequency of incoming calls field | Number of incoming calls received from a destination number. Maintained in contact information manager 208 by incrementing a counter associated with a particular designation number by one each time a call from the destination number is received by communications network interface device 104. |
| Time and date of last outgoing call field | The time and date the latest call to the destination number was initiated by a user using communications network interface device 104. Maintained in contact information manager 208 by deleting an existing value and recording a new value of the time a call is placed for each call initiated. |
| Length of last outgoing call field | The duration of the latest call to the destination number that was initiated by a user using communications network interface device 104. Maintained in contact information manager 208 by deleting an existing value and recording a new value of the duration of the last outgoing call for each call initiated. |
| Average length of outgoing call field | The average length of calls to the destination number initiated by a user using communications network interface device 104. Maintained in contact information manager 208 by deleting an existing value and recording a new value of the average duration calculated using the duration of the current outgoing call for each call initiated. The calculation is made using a stored average and the stored frequency of calls. The stored average and frequency of calls are multiplied and the length of the current call is added to the result. The new average is calculated by dividing the summation by a new frequency of calls which is the stored frequency of calls plus 1. |
| Longest length of outgoing call field | The length of the longest call to the destination number initiated by a user using communications network interface device 104. Maintained in contact information manager 208 by deleting an existing value and recording a new value of the duration only if the duration of the last call is longer than the stored value. |
| Answer status of last outgoing call | The answer status of the last call indicates whether the last call was answered by the recipient or whether the initiating user received a ring but no answer. Maintained in contact information manager 208 by deleting the existing value and updating the field with the appropriate completion information for each new call initiated. This may be useful by telemarketing users in recalling only recipients who did not answer. |
| Outgoing call completion history | The call completion indicates percentage of calls that successfully completed to a destination number. Maintained in the contact information manager 208 by deleting an existing value and recording a new |

| Dynamic Fields | Description |
| --- | --- |
| | value of the average completion rate for each call initiated. The calculation is made using a stored average and the stored frequency of calls. The stored average and frequency of calls are multiplied and, if the call completed successfully, the result is incremented by one. The new completion average is calculated by dividing the summation by a new frequency of calls which is the stored frequency of calls plus 1. |
| Time of last incoming call field | The time the latest call to the destination number was received by a user via communications network interface device 104. Maintained in contact information manager 208 by deleting an existing value and recording a new value of the time a call is received for each call received. |
| Length of last incoming call field | The duration of the latest call to the destination number that was received by a user via communications network interface device 104. Maintained in contact information manager 208 by deleting an existing value and recording a new value of the duration of the last incoming call for each call received. |
| Average length of incoming call field | The average length of calls received from the destination number by communications network interface device 104. Maintained in contact information manager 208 by deleting an existing value and recording a new value of the average duration calculated using the duration of the current incoming call for each call initiated. The calculation is made using a stored average and the stored frequency of calls. The stored average and frequency of calls are multiplied and the length of the current call is added to the result. The new average is calculated by dividing the summation by a new frequency of calls which is the stored frequency of calls plus 1. |
| Longest length of incoming call field | The length of the longest call from the destination number received by communications network interface device 104. Maintained in contact information manager 208 by deleting an existing value and recording a new value of the duration only if the duration of the last call is longer than the stored value. |
| Answer status of last incoming call | The answer status of the last call indicates whether the last call was answered by the recipient or whether the initiating user received a ring but no answer. Maintained in contact information manager 208 by deleting the existing value and updating the field with the appropriate completion information for each new call initiated. This may be useful by telemarketing users in recalling only recipients who did not answer. |
| Incoming call completion history | The call completion indicates percentage of calls that successfully completed to a destination number. Maintained in contact information manager 208 by deleting an existing value and recording a new value of the average completion rate for each call initiated. The calculation is made using a stored average and the stored frequency of calls. The stored average and frequency of calls are multiplied and, if the call completed successfully, the result is incremented by one. The new completion average is calculated by dividing the summation by a new frequency of calls which is the stored frequency of calls plus 1. |

Table 1

Similar to user interface software 204 and call processing component 206, contact information manager 208 may comprise one or more software modules within one subroutine and/or computer program or dispersed through multiple subroutines and/or programs. Contact information manager 208 may be implemented as one or more databases. If the contact information manager comprises multiple databases, the multiple databases are tagged to allow interface among the databases which provides the ability to retrieve information from more than one database with one query.

In addition, in the preferred embodiment, contact information manager 208 allows a user multiple options to retrieve the contact information. The user inputs a retrieval selection for the format in which the user wishes to receive the contact information. Retrieval selections are one or more specifications of presentation of contact information provided by a user in a hierarchal order. A user may specify to have contact information sorted, to have a search performed and be presented with only contact information meeting the search specifications, or any other operation that can be performed on the contact information to provide a specified presentation format. In addition to specifying an operation to be performed, such as sorting or searching, the user also specifies which fields should be analyzed to prepare the data for presentation.

For example, the user may want to receive contact information sorted according to the number of outgoing calls for a particular destination number, from most to least. The user enters a retrieval selection into user input device 106 to sort the frequency of call field from the highest frequency of outgoing calls to the lowest frequency of outgoing calls. The user may also make a secondary selection of sorting in alphabetical order based on the contact name field. In the example, the user is presented with the contact information sorted starting with the destination number with the highest frequency of outgoing calls. If two destination numbers have the same call frequency, the destination numbers are sorted alphabetically based on the contact name. The user then could select to continue to browse the contact information in decreasing frequency of outgoing calls. Various alternative retrieval selections are possible. Flexibility and variety in retrieval selections provides users with ease of obtaining contact information stored in memory 112 and maintained by contact information manager 208.

FIG. 2B illustrates an exemplary contact information manager 208 implementation with multiple databases, including one database to store voice contact information 212A and another to store data contact information 212B. It should be noted that contact information manager 208 may include only one type of database, depending on the type of interface device 104 in use. Both voice contact information database 212A and data contact information database 212B can store a name 218A and 218B, associated with a corresponding destination number 220A and 220B, respectively.

Both databases 212A and 212B include dynamic fields 222A and 222B and static fields 224A and 224B. Dynamic fields 222A stored in voice contact information database 212A may include any of the fields shown in Table 1. The voice contact information database may also store static fields 224 A such as contact names and/or the price per minute to call each of the destination numbers. Similar to the fields stored by the voice contact information database, dynamic fields 222B stored by data contact information database 212B may include any of the fields shown in Table 1. Data contact information database 212B may also store static fields 224B such as the link quality and the data rate of the link.

Interface between databases 212A and 212B occurs by tagging the databases. For example, databases 212A and 212B each have a tag identifier 214A and 214B respectively. Contact information manager 208 allows a user to specify one or more of databases 212A and 212B to search by providing tag identifiers 216A and 216B to search in a retrieval selection. Alternatively, contact information manager 208 may include preset conditions that are automatically processed for particular retrieval selections that retrieve information from more than one database 212A and 212B in which the interface between databases 212A and 212B occurs because databases 212A and 212B are tagged. Any tagging or other database interface as are known to those skilled in the art of database development may be implemented to interface the multiple databases 212A and 212B.

Figure 3:
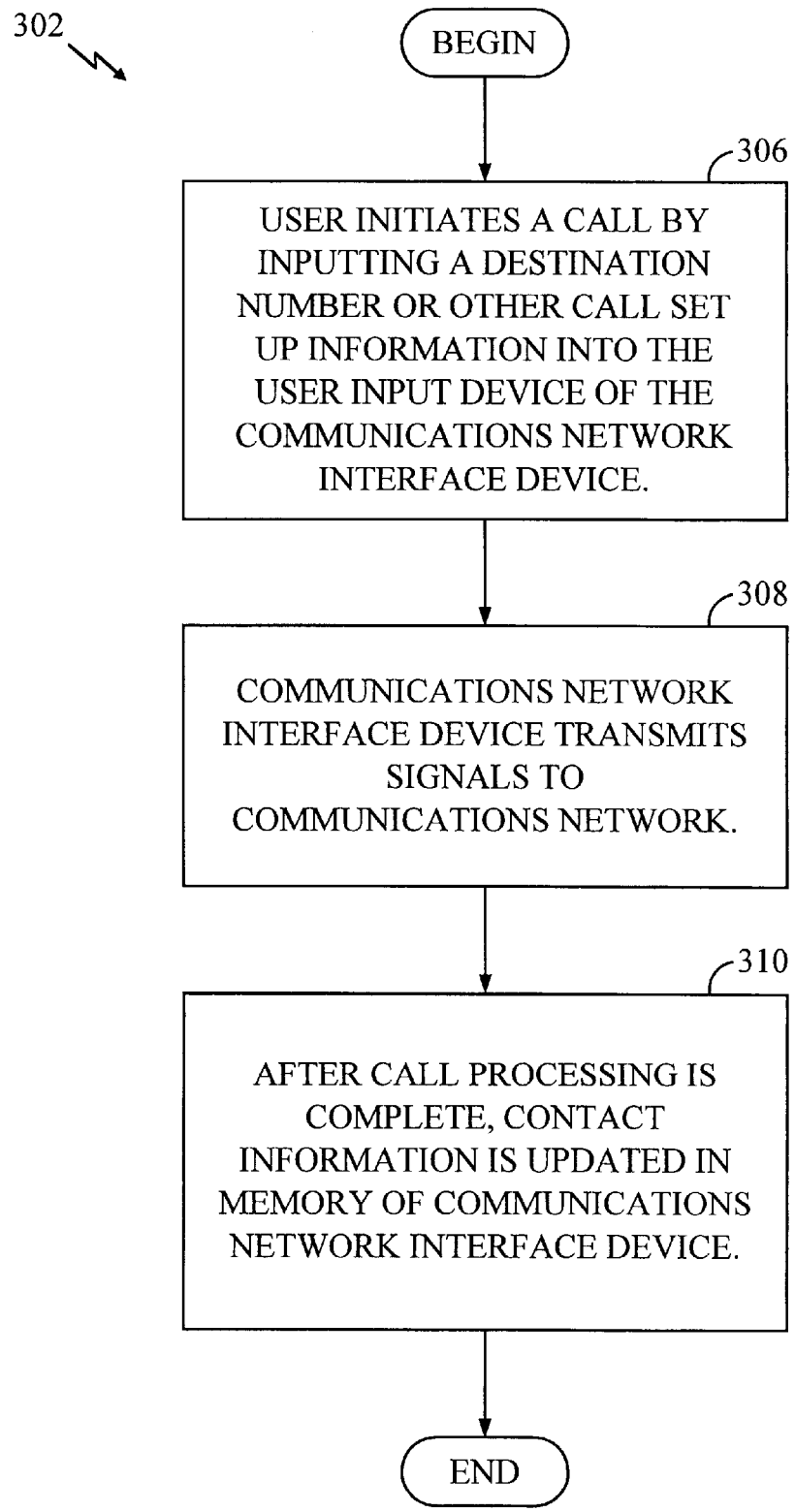
FIG. 3 is a flowchart illustrating the operation of a communications network interface device environment.

FIG. 3 is a flowchart 302 illustrating the operation of communications network interface device 104. The operation of communications network interface device 104 in a specific active communication, such as placing a call to a called party's communications network interface device (not shown), will be described with respect to the components shown in FIGS. 1 and 2.

In step 306, the user initiates a call by inputting a destination number or other call set up information into user input device 106 of communications network interface device 104. In order to ease use of communications network interface device 104, the user may elect to initiate a call by retrieving a number stored in contact information manager 208. The user enters the selection to retrieve a number stored by contact information manager 208 by inputting the selection into user input device 106. The operation of retrieving a destination number stored by contact information manager 208 will be described in further detail with respect to FIG. 4.

The destination number or other call set up information is transmitted to interface 110 to be processed by call process software component 206 residing in memory 112. Call processing software component 206 performs the processing needed by communications network interface device 104 to connect the call via the communications network to a recipient using a second communications network interface device.

In addition, user input device 106 accepts dialed digits from the user and transfers the digits via interface 110 to be temporarily stored in memory 112 by processing of user interface software 204. In addition, user interface software 204 accepts or calculates any additional information needed to be tracked such as the start time of the call.

In step 308, communications network interface device 104 transmits signals to communications network 114. The signal that is sent from communications network interface device 104 contains information needed to establish a call to a called party, such as the destination number of the called party's communications network interface device. Signaling between components within the communications network follows standards established by the industry such as the American National Standards Institute (ANSI) Signaling System Number 7 (SS7) standard or other standards known to those skilled in the art.

In step 310, after call processing is complete, contact information is updated in the memory of communications network interface device 104. Call processing for initiation of the call is complete when the user initiating the call is connected to the called party's communications network interface device. When call processing is complete, information is transferred from user interface software 204 to contact information manager 208.

The call, or specific active communication, proceeds until one of the parties, either the user initiating the call or the recipient, terminates the call in a known manner, such as by entering "END" using a keypad of a mobile telephone, logging off on a personal computer, or placing the receiver onto the base of a telephone (going "on-hook"). Upon termination of the call, processing is performed by the components of the communications network and call processing component 208 of communications network interface device 104 to notify all components that the call is completed and provide information needed for billing the call.

In addition, user interface software 204 performs any remaining needed calculations and/or processing, such as calculating the duration of the call, and sends the contact information to contact information manager 208. After contact information manager 208 has been updated, user interface software 204 discontinues tracking the information and prepares to receive information for the next call. Alternatively, the information may be saved by user interface software 204 and transferred to contact information manager 208 when the user powers down communications network interface device 104. The operation of updating contact information manager 208 will be described in further detail with respect to FIG. 5.

Figure 4:
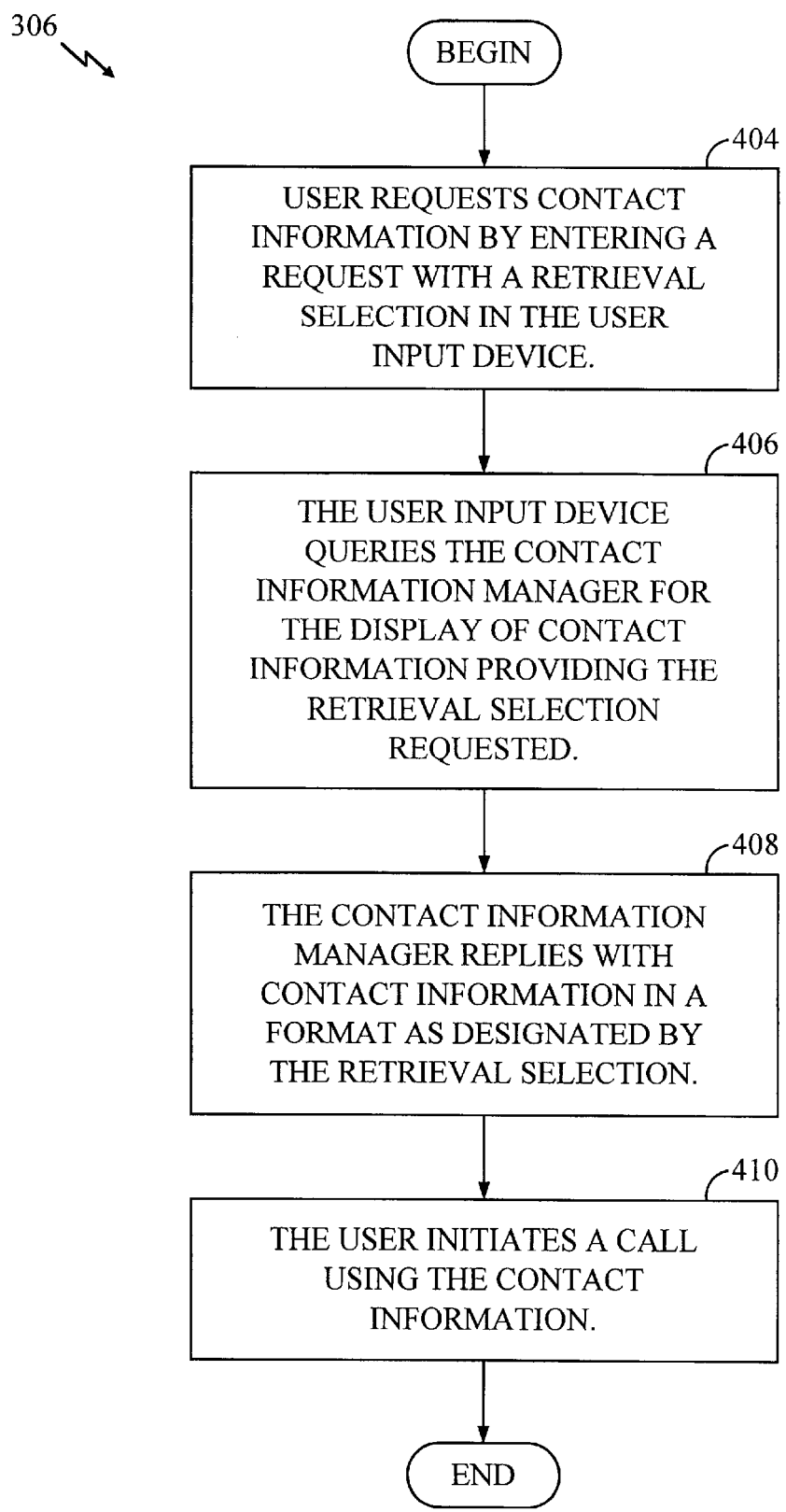
FIG. 4 is a flowchart illustrating the operation of call initiation.

FIG. 4 is a flowchart that illustrates the operation of call initiation block 306. In step 404, the user requests contact information by entering a request with a retrieval selection in user input device 106. After the user specifies a request to retrieve contact information, a menu selection prompts the user to indicate which retrieval selection the user would like. Various retrieval selections are possible. For example, if a user wants to sort first by the frequency of outgoing calls and then alphabetically if two destination numbers have the same outgoing call frequency, the user enters a hierarchal order of retrieval selections including a primary retrieval selection to sort by frequency of outgoing calls and secondary retrieval selection to sort alphabetically.

In step 406, user input device 106 queries contact information manager 208 to display contact information and provides the retrieval selection requested. User input device 106 sends the query via interface 110 to be processed by contact information manager 208. The query indicates that contact information is to be retrieved. In addition, the retrieval selection provides the format for presentation of the contact information to the user. The query initiates processing by contact information manager 208 to retrieve the contact information from memory 112 and format the contact information based on the retrieval selection.

In step 408, the contact information manager replies with the contact information in the format as designated by the retrieval selection. For example, if the user enters a retrieval selection requesting to sort voice contact information from the destination number with the highest frequency of outgoing calls to the destination number with the lowest frequency of outgoing calls, referring to the exemplary embodiment illustrated in FIG. 2B, the contact information presented to the user may be Joe's destination number, 1-800, 111-1111, then Ted's, 1-201-111-1111, and then Jim's 1-410-111-1111.

Any device included in communications network interface device 104 capable of presentation of information to a user may present the contact information. The contact information may be displayed to a human user on a display device (not shown) of communications network interface device 104. Alternatively, the contact information may be vocally communicated to the user if communications network interface device 104 is capable of providing information via synthesized voice mechanism.

Also, a user may be another logic unit or computer system. If the user is another logic unit or computer system, the contact information may be presented electronically via an electronic interface, such as a cable. For example, a personal computer could be attached to a wireless phone and receive the contact information data via an electronic interface. The personal computer could then use the information in the dynamic fields, such as frequency of use, to perform telemarketing studies.

In step 410 the user initiates the call using the contact information. The user selects a particular retrieved destination phone number and then touches a "SEND" key on user input device 106 of communications network interface device 104 to initiate the call in a known manner. In alternate embodiments, in which communications network interface device 104 is not a mobile telephone, the user initiates the call using the appropriate mechanism for call initiation for that particular communications network interface device 104.

Figure 5:
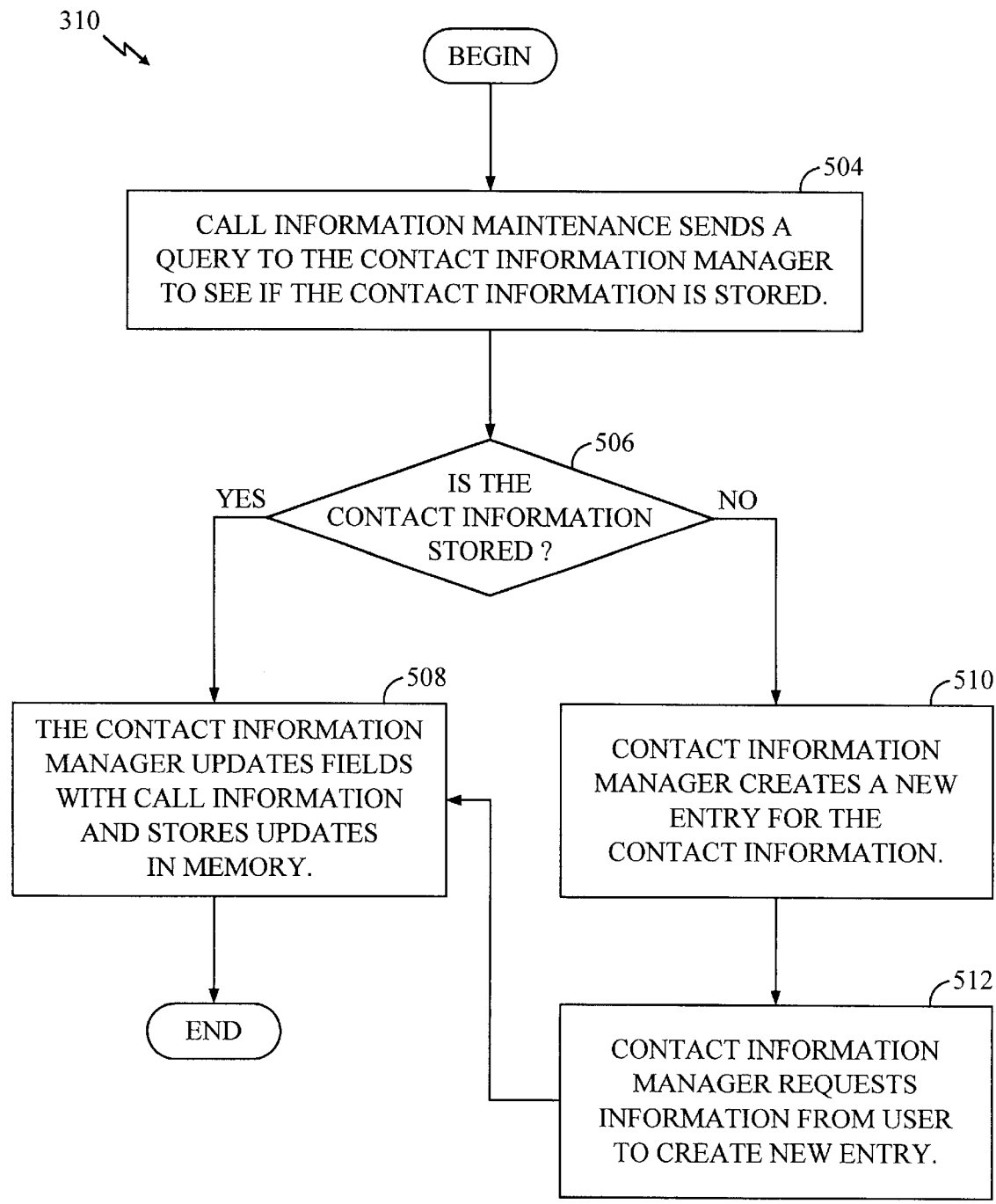
FIG. 5 is a flowchart illustrating the operation of updating contact information.

FIG. 5 is a flowchart illustrating the operation of updating contact information shown generally in block 310.

In step 504, user interface software 204 sends a query to contact information manager 208 to see if contact information is stored. After the call initiated in step 306 is connected to the called party and the parties begin conversing or data transmission begins, user interface software 204 sends a query to contact information manager 208 to see if the contact information (i.e., the destination number) is already stored in memory 112.

In step 506, contact information manager 208 determines if the contact information is stored in memory 112. If the contact information is stored then the call processor proceeds forward to step 508 to update the existing fields in the existing destination number entry. If the contact information is not stored, the call processor proceeds to step 510 to create a new destination number entry.

In step 508, contact information manager 208 updates the fields in memory 112 for the existing destination number entry with the information for the call in progress. Updates may be obtained from user interface software 204 multiple times during a call. For example, initially contact information manager 208 may update a field such as a counter field which stores the number of times a call is placed to a particular destination number. This field could be updated immediately upon completion of call processing to set up a call. After a call is terminated by the parties, duration of the call may be sent to contact information manager 208 to update a longest length of call field. Contact information manager 208 may do calculations such as comparing the length of a call with the length of the call already stored and storing the length of the new call if it is longer than the length of the call stored. Alternatively, contact information manager 208 may compute an average call length using an algorithm.

If it was determined in step 506 that the contact information was not stored then the operation of updating contact information flow 312 proceeds to step 510. In step 510, contact information manager 208 creates a new entry for the contact information. If the user has entered a particular destination number for the first time, then an entry does not exist in contact information manager 208 for that particular destination phone number. Therefore, contact information manager 208 creates a new entry in the database for the new destination number.

In step 512, contact information manager 208 requests information from the user to create the new entry. For example, the destination number must be included in the new entry. The user may input the destination or the destination number may be automatically transferred from user interface software 204. In addition, the user may want to store the name of the person or entity associated with the destination phone number which is not available automatically. If information is needed from the user, the user enters the information via user input device 106. In alternate embodiments in which all information can be obtained automatically, step 512 is not performed. Upon completion of updating the database with information needed, the call processing proceeds from step 512 to step 508.

In an alternate embodiment, the operation of updating contact information may be performed without using the communications network interface device to place a call. In other words, steps 306–310 of FIG. 3 do not need to be performed in order to perform step 310. The user may request to update contact information manager 208 and enter the destination number to be updated in contact information manager 208 without placing a call. For example, the user may want to enter information for static fields at a time other than when placing a call. In addition, the user may want to modify a dynamic field, such as zeroing out a frequency of use counter, without placing a call. A user may want to zero out a frequency of use counter when a large number of calls have been place to a particular destination number but very few future calls are anticipated. For example, when working on a particular business project a large number of calls may be placed to a business number but upon completion of the project very few calls are anticipated. The frequency counter associated with the business number can be zeroed out upon completion of the business project to avoid seeing the business number first when the destination numbers in contact information manager 208 are sorted from the highest frequency to the lowest frequency.

While various embodiments of the present invention has been described above it should be understood that they have been presented by way of example only in not limitation. Thus the breadth and scope of the present invention should not be limited by any of the above described exemplary embodiments but should be defined only in accordance with the following claims and their equivalents.

What is claimed is:

1. A method for managing contact information stored in a memory of a communications network interface device, the memory containing a static field and a dynamic field, comprising the steps of:

(a) storing contact information in the memory and associating the stored contact information with the static field;

(b) storing information relating to a specific active communication of the interface device within the communications network interface device;

(c) associating the information stored in step (b) with the dynamic field of the memory; and (d) sorting the stored contact information according to the stored information associated with the dynamic field.

2. The method of claim 1, wherein the stored contact information associated with the static field comprises destination information for at least one other communications network interface device coupled to a communications network, and the information associated with the dynamic field comprises at least one of frequency of outgoing calls, frequency of incoming calls, length of outgoing calls, length of incoming calls, time of last outgoing call, and time of last incoming call, comprising the further steps of:

(e) updating the information associated with the dynamic field upon completion of a specific communication with a stored destination number; and (f) re-sorting the stored contact information according to the updated information associated with the dynamic field.

3. The method of claim 2, wherein the memory contains a plurality of static fields, comprising the further steps of:

(g) performing step (f) as a function of the information associated with a selected one or more of the plurality of static fields.

4. The method of claim 2, wherein the first interface device comprises a wireless telephone and the at least one other interface device comprises devices selected from the group including wireless telephones and wireless paging devices, the stored contact information includes a telephone number associated with the at least one other interface device, comprising the further steps of:

(g) storing contact information associated with a plurality of other interface devices;

(h) initially sorting the stored contact information according to the static field; and (i) following step (h), sorting the stored contact information according to the stored information associated with the dynamic field.

5. The method of claim 4, wherein the memory contains a plurality of dynamic fields, comprising the further steps of:

(j) associating the information stored in step (b) with one or more of the plurality of dynamic fields as a function of the type of information being stored; and (k) sorting the stored contact information as a function of the information associated with a selected one or more of the plurality of dynamic fields.

6. The method of claim 4, further comprising the steps of:

(j) selecting one item of stored contact information; and (k) activating the first interface device to communicate via the communications network with the at least one other communications network interface device associated with a telephone number contained in the selected item of stored contact information.

7. The method of claim 4, further comprising the step of:

(j) displaying on a display contained in the first interface device the sorted stored contact information.

8. In a communications network interface device, apparatus for managing contact information, comprising:

a memory containing a static field and a dynamic field;

means for storing contact information in the memory and associating the stored contact information with the static field;

means for storing information relating to a specific active communication of the interface device within the communications network and for associating the information relating to a specific active communication with the dynamic field of the memory; and means for sorting the stored contact information according to the stored information associated with the dynamic field.

9. The apparatus of claim 8, wherein the stored contact information associated with the static field comprises destination information for at least one other interface device coupled to the communications network, and the information associated with the dynamic field comprises at least one of frequency of outgoing calls, frequency of incoming calls, length of outgoing calls, length of incoming calls, time of last outgoing call, and time of last incoming call.

10. The apparatus of claim 9, further comprising:

means for updating the information associated with the dynamic field upon completion of a specific communication with a stored destination number; and means for re-sorting the stored contact information according to the updated information associated with the dynamic field.

11. The apparatus of claim 10, wherein the memory contains a plurality of static fields, and further comprising:

means for sorting the stored contact information as a function of the information associated with a selected one or more of the plurality of static fields.

12. The apparatus of claim 10, wherein the first interface device comprises a wireless telephone and the at least one other interface device comprises devices selected from the group including wireless telephones and wireless paging devices, the stored contact information includes a telephone number associated with the at least one other interface device, further comprising:

means for storing contact information associated with a plurality of other interface devices;

means for sorting the stored contact information according to the static field; and means for sorting the stored contact information according to the stored information associated with the dynamic field.

13. The apparatus of claim 12, wherein the memory contains a plurality of dynamic fields, and further comprising:

means for associating the stored information relating to a specific active communication with one or more of the plurality of dynamic fields as a function of the type of information being stored; and means for sorting the stored contact information as a function of the information associated with a selected one or more of the plurality of dynamic fields.

14. The apparatus of claim 13, further comprising:

means for selecting one item of stored contact information; and means for activating the first interface device to communicate via the communications network with the at least one other communications network interface device associated with a telephone number contained in the selected item of stored contact information.

15. The apparatus of claim 14, further comprising:

means for displaying on a display contained in the first interface device the sorted stored contact information.

16. For use in a communications network interface device having a memory containing a static field and a dynamic field, a computer program product for managing contact information comprising a computer useable medium having computer program logic recorded thereon for enabling a processor in a computer system to organize data, said computer program logic comprising:

means for enabling the processor to store contact information in the memory and associate the stored contact information with the static field;

means for enabling the processor to store information relating to a specific active communication of the interface device within the communications network and to associate the information relating to a specific active communication with the dynamic field of the memory; and means for enabling the processor to sort the stored contact information according to the stored information associated with the dynamic field.

17. The computer program product of claim 16, wherein the stored contact information associated with the static field comprises destination information for at least one other interface device coupled to the communications network, and the information associated with the dynamic field comprises at least one of frequency of outgoing calls, frequency of incoming calls, length of outgoing calls, length of incoming calls, time of last outgoing call, and time of last incoming call, further comprising:

means for enabling the processor to update the information associated with the dynamic field upon completion of a specific communication with a stored destination number; and means for enabling the processor to re-sort the stored contact information according to the updated information associated with the dynamic field.

18. The computer program product of claim 17, wherein the memory comprises a plurality of static fields, the stored contact information includes a telephone number associated with the at least one other interface device and at least one other item of information associated with the at least one other interface device, further comprising:

means for enabling the processor to store contact information associated with a plurality of other interface devices;

means for enabling the processor to sort the stored contact information according to each of the static fields; and means for enabling the processor to sort the stored contact information according to the stored information associated with the dynamic field and according to the contact information stored in the plurality of static fields.

19. The computer program product of claim 17, wherein the first interface device comprises a wireless telephone and the at least one other interface device comprises devices selected from the group including wireless telephones and wireless paging devices, the stored contact information includes a telephone number associated with the at least one other interface device, further comprising:

means for enabling the processor to store contact information associated with a plurality of other interface devices;

means for enabling the processor to sort the stored contact information according to the static field; and means for enabling the processor to sort the stored contact information according to the stored information associated with the dynamic field.

20. The computer program product of claim 19, further comprising:

means for enabling the processor to select one item of stored contact information; and means for enabling the processor to activate the first interface device to communicate via the communications network with the at least one other communications network interface device associated with a telephone number contained in the selected item of stored contact information.

* * * * *